United States Patent Office 3,235,526
Patented Feb. 15, 1966

3,235,526
DISPERSING ORGANIC PIGMENTS IN AN
AQUEOUS MEDIUM
Charles R. Williams, Longmeadow, Mass., assignor to
Monsanto Company, a corporation of Delaware
No Drawing. Original application Dec. 29, 1960, Ser.
No. 79,121. Divided and this application Sept. 21,
1962, Ser. No. 225,374
7 Claims. (Cl. 260—29.6)

This invention relates to an improved method of dispersing organic pigments in aqueous systems.

This application is a division of the copending applicaiton Serial No. 79,121, filed December 29, 1960, now abandoned.

The dispersing of organic pigments in an aqueous medium has always presented the problem of obtaining an effective and a stable disperison of the organic pigment. This problem exists because of the complex structure of organic pigments and because of their generally high molecular weights. A satisfactory dispersion of these pigments is necessary in order to prevent settling and caking of the pigment, particularly while the dispersion is being stored or shipped.

An effective and stable dispersion of an organic pigment in water is desired because of the many advantages resulting therefrom. Some of these advantages are ease of cleanability during use, reduction in potential fire hazard, ease of handling and use, and reduction in cost of manufacturing. For example, the new outdoor latex surface coating compositions employ an aqueous medium, and these compositions definitely offer the above advantages as well as rapid drying. However, it is difficult to prepare effective dispersions of an organic pigment in such aqueous media.

Therefore, the obtaining of effective and stable dispersions of organic pigments in an aqueous medium by employing an organic dispersing agent therein is of extreme importance to the industry.

Thus, it is an object of this invention to provide an improved process for preparing aqueous dispersions of organic pigments by employing certain organic polymers therein as a dispersing agent.

Another object of this invention is to provide improved aqueous surface coating compositions which include an organic pigment and which employ certain organic polymers therein as the dispersing agent.

Briefly, according to this invention, the foregoing and other objects are attained by incorporating in an aqueous medium an alkali metal, ammonium or substituted ammonium salt of a substituted amide of an olefin-maleic anhydride copolymer, which is an effective dispersant for organic pigments.

The following examples are set forth to illustrate more clearly the principle and practice of this invention and are not intended to limit the scope thereof. Unless otherwise indicated, all parts are parts by weight.

Example I

Dissolve separately in acetone, stoichiometrically equivalent portions of aniline and an ethylene-maleic anhydride copolymer having a molecular weight of about 1500 (as determined by the specific viscosity of a 1% solution of the ethylene-maleic anhydride copolymer in dimethyl formamide). Mix together, under agitation, the two solutions and reflux at about 56° C. for 3 hours. Recover the precipitate formed therefrom by vacuum filtration. Dissolve the recovered precipitate in a sodium hydroxide solution so as to form a 25% solids solution of the sodium salt of the half phenyl amide of the ethylene-maleic anhydride copolymer having a pH of 9–10. The solution is subsequently identified as A.

Example II

Example I is repeated with the exception of n-propyl amine being employed therein in place of aniline. The resulting solution contains the sodium salt of the half propyl amide of the ethylene-maleic anhydride copolymer. This solution is subsequently identified as B.

Example III

Example I is repeated with the exception of cyclohexyl amine being employed therein in place of aniline. The resulting solution contains the sodium salt of the half cyclohexyl amide of the ethylene-maleic anhydride copolymer and is subsequently identified as C.

Example IV

Example I is repeated with the exception of benzyl amine being employed therein in place of the aniline and monoethanol amine being employed therein in place of the sodium hydroxide. The resulting solution contains the monoethanol amine salt of the half benzyl amide of the ethylene-maleic anhydride copolymer. This solution is subsequently identified as D.

Example V

Example I is repeated with the exception of p-nonyl phenyl amine being employed therein in place of aniline. The resulting solution contains the sodium salt of the half nonyl phenyl amide of the ethylene-maleic anhydride copolymer and is subsequently identified as E.

Example VI

Example II is repeated with the exception of a propylene-maleic anhydride copolymer having a molecular weight of about 1500 (as determined by the specific viscosity of a 1% solution of the propylene-maleic anhydride copolymer in dimethyl formamide) being employed therein in place of the ethylene-maleic anhydride copolymer. The resulting solution contains the sodium salt of the half proply amide of the propylene-maleic anhydride copolymer and is subsequently identified as F.

Example VIII

Example III is repeated with the exception of a propylene-maleic anhydride copolymer having a molecular weight of about 1500 (as determined by the specific viscosity of a 1% solution of the propylene-maleic anhydride copolymer in dimethyl formamide) being employed therein in place of the ethylene-maleic anhydride copolymer. The resulting solution contains the sodium salt of the half cyclohexyl amide of the propylene-maleic anhydride copolymer and is subsequently identified as G.

Example VIII

Example II is repeated with the exception of an isobutylene-maleic anhydride copolymer having a molecular weight of about 1500 (as determined by the specific viscosity of a 1% solution of the isobutylene-maleic anhydride copolymer in dimethyl formamide) being employed therein in place of the ethylene-maleic anhydride copolymer and ammonium hydroxide being employed therein in place of sodium hydroxide. The resulting solution contains the ammonium salt of the half propyl amide of the isobutylene-maleic anhydride copolymer and is subsequently identified as H.

Example IX

Example I is repeated with the exception of diethyl amine being employed therein in place of the aniline. The resulting solution contains the sodium salt of the half diethyl amide of the ethylene-maleic anhydride copolymer and is subsequently identified as I.

Example X

Example I is repeated with the exception of dicyclohexyl amine being employed therein in place of aniline. The resulting solution contains the sodium salt of the half dicyclohexyl amide of the ethylene-maleic anhydride copolymer and is subsequently identified as J.

Example XI

Example I is repeated with the exception of methyl n-propyl amine being employed therein in place of aniline. The resulting solution contains the sodium salt of the half methyl n-propyl amide of the ethylene-maleic anhydride copolymer and is subsequently identified as K.

Example XII

A stoichiometric excess of anhydrous ammonia is bubbled through a 20% solution by weight of ethylene-maleic anhydride copolymer in acetone over a period of 30 minutes. The ethylene-maleic anhydride copolymer is the same as that employed in the previous examples. The precipitate resulting therefrom is the ammonium salt of the half amide of the ethylene-maleic anhydride copolymer. This is dissolved in water to form a 25% solids solution having a pH of 8–9, and is subsequently identified as L.

Example XIII

The purpose of this example is to illustrate the dispersing action of the solutions prepared in Examples I–XII on organic pigments in water by using each dispersant separately with separate samples of organic pigments; namely, phthalocyanine blue (Monastral Blue) and toluidine red (CP Toner A–2990). Each pigment sample contains 40% by weight of the individual organic pigment in water. Dispersing action is determined by measuring the viscosity (at 25° C.) of each sample, and a viscosity reading of above 1000 centipoises is considered unacceptable. The results are as follows:

| Dispersant | Phthalocyanine Blue | | Toluidine Red | |
|---|---|---|---|---|
| | Percent Dispersant [1] | Viscosity (cps.) | Percent Dispersant [1] | Viscosity |
| A | 1.1 | 80 | 2.6 | 240 |
| B | 1.7 | 300 | 4.2 | 405 |
| C | 1.7 | 364 | 3.0 | 436 |
| D | 1.5 | 350 | 2.6 | 204 |
| E | 1.7 | 380 | 4.0 | 440 |
| F | 1.6 | 280 | 2.8 | 250 |
| G | 1.5 | 350 | 2.5 | 250 |
| H | 1.8 | 350 | 4.0 | 450 |
| I | 1.4 | 150 | 2.5 | 230 |
| J | 1.8 | 600 | 4.2 | 530 |
| K | 1.4 | 150 | 2.5 | 230 |
| L | 1.0 | >1,000 | 1.0 | >1,000 |
| L | 2.0 | >1,000 | 2.0 | >1,000 |
| L | 4.0 | >1,000 | 4.0 | >1,000 |
| L | 7.0 | >1,000 | 7.0 | >1,000 |

[1] Percent dispersant solids based on weight of organic pigment solids employed therein.

Example XIV

One hundred parts of phthalocyanine blue (Monastral Blue) are dry blended in a Baker Perkins blender with 2 parts of the acid form of the half cyclohexyl amide of an ethylene-maleic anhydride copolymer of 1500 molecular weight. This dry blend is then added under agitation to 150 parts of water, which contains therein 0.73 part of sodium hydroxide. A satisfactory dispersion is obtained having a viscosity reading of about 350 cps. at 25° C.

Example XV

This example is set forth to illustrate the storage stability of an aqueous latex surface coating composition containing the dispersant prepared as described in Example III. A coating composition containing 200 parts of water, 50 parts of phthalocyanine blue (Monastral Blue), 1 part of the sodium salt of the half cyclohexyl amide of the ethylene-maleic anhydride copolymer, and 120 parts of a styrene-butadiene copolymer is prepared and allowed to stand at room temperature for 6 months. After 6 months, the composition is still a satisfactory dispersion showing little or no settling of the organic pigment and having essentially the same viscosity as originally prepared.

This invention is directed to an improved process of dispersing water-insoluble organic pigments in an aqueous medium by employing certain salts of a substituted amide of an olefin-maleic anhydride copolymer as the dispersant, which salts may be either the ammonium, substituted ammonium or alkali metal salts thereof. The quantity of the salt of said substituted amide necessary to produce an effective dispersion is 0.1–7.0 weight percent based on the weight of the organic pigment employed. The salt of the substituted amide of an olefin-maleic anhydride copolymer has in its structure recurring groups of the formulae:

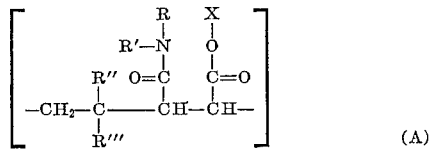

(A)

and

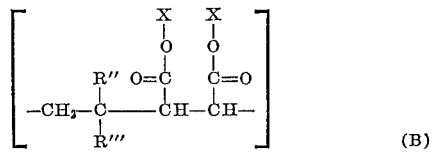

(B)

with the groups of Formula A constituting 50–100% and preferably 80–100% of the total of groups (A) and (B); wherein R is selected from the group consisting of alkyl, aryl, alkaryl, aralkyl and cycloalkyl radicals; R' is selected from the group consisting of hydrogen, alkyl, aryl, alkaryl, aralkyl and cycloalkyl radicals; R'' is selected from the group consisting of hydrogen, methyl and ethyl; R''' is selected from the group consisting of hydrogen and methyl, providing that when R'' is ethyl, R''' is hydrogen; and wherein the said alkyl radicals have 3–18 carbon atoms, said aryl radicals have 1–3 aromatic rings, said alkaryl and aralkyl radicals have an aliphatic moiety of 1–10 carbon atoms and an aromatic moiety of 1–2 rings associated therewith and said cycloalkyl radicals have 5–7 carbon atoms. In the above composition, X is a positive charged ion selected from the group consisting of an ammonium ion, an alkali metal ion such as a sodium or potassium ion, and the ions formed from amines such as mono-, di-, and tri-methyl amines, mono-, di-, and tri-ethyl amines, mono-, di-, tri-n-propyl and isopropyl amines, mono-, di-, and tri-ethanol amines, 2-methyl-2-amino-propanol-1, and mixtures of the above amines. The pH of a solution of the salt of the said substituted amide should be in the range of 4–11 and preferably in the range of 7–10. Preferably, the polymers contain 3–20 recurring groups of (A) and (B). In the practice of this invention, the preferred salt of the substituted amide of an olefin-maleic anhydride copolymer is the sodium salt of the cyclohexyl amide of an ethylene-maleic anhydride copolymer.

Broadly, the process for preparing the substituted amide of an olefin-maleic anhydride copolymer employed in the practice of this invention comprises dissolving an olefin-maleic anhydride copolymer and up to a stoichiometrically equivalent portion of a substituted amine in an inert liquid organic solvent. The solution is maintained at a temperature between about 20° C. and about 150° C. for a period from about 2 minutes to 3 hours. As used herein, "inert organic solvent" means any organic solvent that is not reactive with a carboxylic anhydride or an amine and includes solvents selected from the class consisting of ketones, aromatics and esters.

The preferred process for preparing the copolymers employed in the practice of this invention comprises (a) dissolving separately in an inert liquid organic solvent an olefin-maleic anhydride copolymer and up to a stoichiometrically equivalent portion of a substituted amine, (b) mixing the two solutions together in order to react the olefin-maleic anhydride and the substituted amine, and (c) refluxing for a period of about 2 to 3 hours. Refluxing is used to obtain a high product yield, generally above 90%. The product thus obtained is the acid form of the substituted amide of an olefin-maleic anhydride copolymers.

The olefin-maleic anhydride copolymer portion of a substituted amide of an olefin-maleic anhydride copolymer employed herein may be either an eythlene-maleic anhydride, a propylene-maleic anhydride, a butylene-maleic anhydride, or an isobutylene-maleic anyhydride copolymer. The basic structure of these copolymers have recurring groups of the formula:

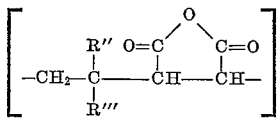

wherein R″ is selected from the group consisting of hydrogen, methyl and ethyl radicals, and R‴ is selected from the group consisting of hydrogen and methyl radicals. However, where R″ of the above formula is ethyl, then of necessity R‴ must be hydrogen in order to fulfill the requirements of a normal butylene-maleic anhydride copolymer. The preferred olefin-maleic anhydride copolymer is an ethylene-maleic anhydride copolymer wherein R″ and R‴ in the formula are hydrogen and the number of recurring groups of the formula are 3–20.

The substituted amine employed herein in preparing the substituted amide of an olefin-maleic anhydride copolymer is represented by the formula:

wherein R is selected from the group consisting of alkyl, aryl, alkaryl, aralkyl and cycloalkyl radicals, and R′ is selected from the group consisting of hydrogen, alkyl, aryl, alkaryl, aralkyl and cycloalkyl radicals. The alkyl radicals of the above formula have 3–18 carbon atoms. The aryl radicals have 1–3 aromatic rings. The alkaryl and aralkyl radicals have an aliphatic moiety of 1–10 carbon atoms and an aromatic moiety of 1–2 rings associated therewith. The cycloalkyl radicals have 5–7 carbon atoms.

Typical examples of the substituted amine compounds which may be employed herein are butyl amine, octyl amine, octadecyl amine, aniline, alpha-naphthyl amine, anthramine, benzyl amine, xylyl amine (tolubenzyl amine), toluidine, p-(n-butyl) aniline, p-nonyl phenyl amine, cyclohexyl amine, cyclopentyl amine, diethyl amine, dibutyl amine, dioctyl amine, dibenzyl amine, dicyclohexyl amine, methyl ethyl amine, methyl n-propyl amine, methyl octyl amine, methyl benzyl amine, methyl cyclopentyl amine and mixtures thereof. The preferred substituted amine is cyclohexyl amine wherein R is a cyclohexyl radical and R′ is hydrogen.

The advantages of this invention are found in the ability of the salt of the substituted amide of an olefin-maleic anhydride copolymer to disperse organic pigments in an aqueous medium so as to provide stable dispersions of the organic pigments even while storing or shipping. For example, an aqueous latex coating composition having incorporated therein the dispersing polymer and an organic pigment still remains a satisfactory dispersion after 6 months' storage. Typical examples of the organic pigments which are readily dispersed in the practice of this invention are the phthalocyanine blues, phthalocyanine green, toluidine reds, Hansa yellow, B.O.N. reds, litho reds and para reds. A few specific applications include textile print paste systems such as oil-in-water, water-in-oil, printing inks, predispersed organic pigment systems, dispersions of organic pigments in aqueous latex surface coating compositions, dispersions of insecticides, fungicides and dispersions of rubber chemicals for purposes of satisfactory compounding.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

What is claimed is:

1. In a process for preparing dispersions of water-insoluble organic pigments in an aqueous medium; the improvement which comprises incorporating in the aqueous medium a salt of a substituted amide of an olefin-maleic anhydride copolymer in the amount of 0.1–7.0 weight percent based on the weight of the organic pigment dispersed therein; said salt of the substituted amide of an olefin-maleic anhydride copolymer having in its structure recurring groups of the formulae:

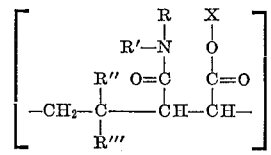

(A)

and

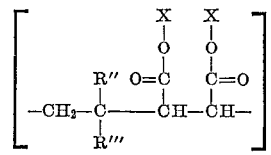

(B)

with the groups of Formula A constituting 50–100% of the total of groups (A) and (B); wherein R is selected from the group consisting of alkyl, aryl, alkaryl, aralkyl and cycloalkyl radicals; R′ is selected from the group consisting of hydrogen, alkyl, aryl, alkaryl, aralkyl and cycloalkyl radicals; R″ is selected from the group consisting of hydrogen, methyl and ethyl; R‴ is selected from the group consisting of hydrogen and methyl, providing that when R″ is ethyl, R‴ is hydrogen; and X is a positive charged ion selected from the group consisting of an ammonium ion, an alkali metal ion and substituted ammonium ions; said alkyl radicals having 3–18 carbon atoms; said aryl radicals having 1–3 aromatic rings; said alkaryl and aralkyl radicals having an aliphatic moiety of 1–10 carbon atoms and an aromatic moiety of 1–2 rings associated therewith; said cycloalkyl radicals having 5–7 carbon atoms.

2. A process as described in claim 1 wherein the num- of groups of Formulae A and B total 3–20.

3. A process as described in claim 1 wherein the salt of the substituted amide of the olefin-maleic anhydride copolymer is the sodium salt.

4. A process as described in claim 1 wherein the salt of the substituted amide of the olefin-maleic anhydride copolymer is the ammonium salt.

5. A process as described in claim 1 wherein the salt of the substituted amide of an olefin-maleic anhydride copolymer is the sodium salt of the cyclohexyl amide of an ethylene-maleic anhydride copolymer.

6. In an aqueous latex surface coating composition which comprises a water-insoluble organic pigment dispersed in an aqeuous latex of a film forming polymer; the improvement which comprises incorporating therein, a salt of a substituted amide of an olefin-maleic anhydride copolymer in the amount of 0.1–7.0 weight percent based on the weight of the organic pigment dispersed therein; said salt of the substituted amide having in its structure recurring groups of the formulae:

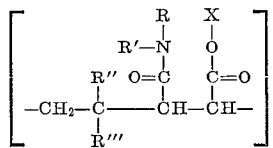
(A)

and

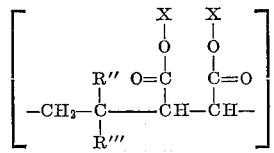
(B)

with the total groups A and B having a value of 3–20 of which total A constitutes 50–100%; wherein R is selected from the group consisting of alkyl, aryl, alkaryl, aralkyl and cycloalkyl radicals; R′ is selected from the group consisting of hydrogen, alkyl, aryl, alkaryl, aralkyl and cycloalkyl radicals, R″ is selected from the group consisting of hydrogen, methyl and ethyl; R‴ is selected from the group consisting of hydrogen and methyl, providing that when R″ is ethyl, R‴ is hydrogen; X is selected from the group consisting of ammonium, substituted ammonium and alkali metal ions; said alkyl radicals having 3–18 carbon atoms; said aryl radicals having 1–3 aromatic rings; said alkaryl and aralkyl radicals having an aliphatic moiety of 1–10 carbon atoms and an aromatic moiety of 1–2 rings associated therewith; said cycloalkyl radicals having 5–7 carbon atoms.

7. An aqueous latex surface coating composition as described in claim 6 wherein the dispersing agent is the ammonium salt of the cyclohexyl amide of an ethylene-maleic anhydride copolymer.

References Cited by the Examiner
UNITED STATES PATENTS 2,930,775  3/1960  Fordyce et al. _____ 260—29.6
3,000,840  9/1961  Johnson et al. _____ 260—29.6

MURRAY TILLMAN, *Primary Examiner.*